(12) United States Patent
Janutin et al.

(10) Patent No.: US 9,956,593 B2
(45) Date of Patent: May 1, 2018

(54) MECHANICAL SUPPORT RAIL CLEANERS FOR CLEANING SUPPORT RAILS OF WORKPIECE SUPPORTS IN MACHINE TOOLS

(75) Inventors: Andreas Janutin, Chur (CH); Peter Dubler, Surcuolm (CH); Claus Boehringer, Igls (CH); Andreas Neuweiler, Chur (CH)

(73) Assignee: TRUMPF Schweiz AG, Gruesch (CH)

(*) Notice: Subject to any disclaimer, the term of this patent is extended or adjusted under 35 U.S.C. 154(b) by 1211 days.

(21) Appl. No.: 12/976,288

(22) Filed: Dec. 22, 2010

(65) Prior Publication Data

US 2011/0146708 A1 Jun. 23, 2011

(30) Foreign Application Priority Data

Dec. 23, 2009 (DE) .................... 10 2009 060 137

(51) Int. Cl.
| | |
|---|---|
| *B08B 1/00* | (2006.01) |
| *B08B 1/02* | (2006.01) |
| *B08B 1/04* | (2006.01) |
| *B08B 7/02* | (2006.01) |
| *B23K 26/10* | (2006.01) |
| *B23K 26/70* | (2014.01) |

(52) U.S. Cl.
CPC ............... *B08B 1/00* (2013.01); *B08B 1/008* (2013.01); *B08B 1/02* (2013.01); *B08B 1/04* (2013.01); *B08B 7/02* (2013.01); *B23K 26/10* (2013.01); *B23K 26/702* (2015.10)

(58) Field of Classification Search
CPC .......... B08B 1/00; B08B 1/008; B23K 26/422
USPC ................................. 15/93.1, 93.4
See application file for complete search history.

(56) References Cited

U.S. PATENT DOCUMENTS 3,641,618 A * 2/1972 Rainey et al. ............... 15/312.1
3,806,979 A * 4/1974 Bonami ........................ 15/21.1
(Continued)

FOREIGN PATENT DOCUMENTS

| CN | 101269740 A | 9/2008 |
|---|---|---|
| DE | 4427910 A1 | 2/1996 |

(Continued)

OTHER PUBLICATIONS

English Translation of Chinese Office Action from related application No. CN 201010625033.7, dated Apr. 14, 2014, 7 pages.

*Primary Examiner* — Douglas Lee
(74) *Attorney, Agent, or Firm* — Fish & Richardson P.C.

(57) ABSTRACT

The disclosure relates to mechanical support rail cleaners for cleaning support rails of workpiece supports in machine tools, such as in machine tools for thermally cutting workpieces. The cleaners include one or more cleaning member carriers, which carry at least one cleaning member, and a parallel drive, by means of which the cleaning member and the support rail can be moved relative to each other in parallel with a lateral longitudinal face of the support rails and transversely relative to a longitudinal axis of the support rail to remove deposits from the support rail by means of the cleaning member. The support rail cleaner further includes a transverse drive configured to periodically move the one or more cleaning member carriers and the support rail towards and away from each other transversely relative to the lateral longitudinal face of the support rail.

17 Claims, 5 Drawing Sheets

(56) References Cited

U.S. PATENT DOCUMENTS

| | | | |
|---|---|---|---|
| 5,261,192 A * | 11/1993 | Nelson | 451/92 |
| 5,482,562 A | 1/1996 | Abernathy | |
| 6,033,522 A | 3/2000 | Iwata et al. | |
| 6,299,698 B1 * | 10/2001 | Emami et al. | 134/6 |
| 8,245,376 B2 | 8/2012 | Graf et al. | |
| 2003/0061675 A1 * | 4/2003 | Sugarman | 15/77 |
| 2006/0075593 A1 | 4/2006 | Graf et al. | |
| 2010/0146721 A1 * | 6/2010 | Villanueva Sautu | 15/21.1 |

FOREIGN PATENT DOCUMENTS

| | | |
|---|---|---|
| DE | 202004015922 U1 | 3/2006 |
| DE | 102004060085 A1 | 6/2006 |
| EP | 1655081 A1 | 5/2006 |
| EP | 2082813 A1 | 7/2009 |
| GB | 2174350 A * | 11/1986 |
| WO | 2004043638 A1 | 5/2004 |
| WO | 2005077552 A1 | 8/2005 |
| WO | WO 2008142176 A1 * | 11/2008 |

* cited by examiner

MECHANICAL SUPPORT RAIL CLEANERS FOR CLEANING SUPPORT RAILS OF WORKPIECE SUPPORTS IN MACHINE TOOLS

CROSS REFERENCE TO RELATED APPLICATION

This application is a continuation of and claims priority under 35 U.S.C. § 119 to European Patent Application No. EP 10 2009 060 137.6, filed on Dec. 23, 2009. The contents of this EP application are hereby incorporated by reference in their entirety.

TECHNICAL FIELD

This disclosure relates to cleaning workpiece supports.

BACKGROUND

When workpieces are processed on a machine tool, they are often supported on a workpiece support. In particular, when workpieces are cut thermally, there are used workpiece supports that have a plurality of support rails arranged in a parallel manner. The support rails define at the upper sides thereof a support face for the workpiece, for example, a metal sheet, to be processed. The support rails are generally serrated at the upper side thereof so that the workpieces can rest in a point-like manner on the tips of the serrations of the support rails.

During the processing operation, the support rails are heavily contaminated, particularly between the support serrations and at the lateral longitudinal faces thereof in the region of the support serrations. For example, molten metal and slag drips from above onto the support rails during laser cutting of metal sheets and sometimes remains bonded there. From time to time, the support rails have to have the bonded deposits removed.

It is known from WO 2004/043638 A1 to use a mechanical support rail cleaner mentioned in the introduction to clean the support rails. In the support rail cleaner of the prior art, the cleaning members are constituted by a plurality of cleaning teeth that are arranged at mutually facing sides of two tines of a fork-like cleaning member carrier.

To clean a support rail, the support rail cleaner is positioned on the support rail from above so that the support rail is arranged in the intermediate space between the tines of the fork-like cleaning member carrier. The deposits on the support rail are removed by the cleaning member carrier repeatedly being lifted and lowered along the lateral longitudinal faces of the support rail by means of an electric motor. The support rail cleaner is further gradually advanced in the longitudinal direction of the support rail by an operator.

SUMMARY

The invention relates to support rail cleaners for cleaning support rails of workpiece supports in machine tools, for example, in machine tools for thermally cutting workpieces. The cleaners have a cleaning member carrier, on which at least one cleaning member is provided, and a parallel drive, by means of which the cleaning member and the support rail can be moved relative to each other in parallel with a lateral longitudinal face of the support rail associated with the cleaning member carrier and transversely relative to the longitudinal axis of the support rail to remove deposits from the support rail by means of the cleaning member.

In certain embodiments, the support rail cleaner is provided with a transverse drive, by means of which the cleaning member carrier and the support rail can be moved towards and away from each other in a periodic manner and transversely in relation to the lateral longitudinal face of the support rail associated with the cleaning member carrier.

The repeated movement of the cleaning member carriers and the support rail towards and away from each other in a direction transverse relative to the lateral longitudinal face brings about an intermittent action on the support rail or the deposits on the support rail with the cleaning member or the cleaning members which is/are provided on the cleaning member carrier. Deposits which are already loosened can be conveyed away or fall down when the cleaning members are moved (briefly) away from the support rail or the deposits on the support rail. Deposits which have already been loosened are thereby prevented from impairing the cleaning operation.

Whenever the cleaning member carrier is briefly moved a relatively large distance, e.g., a few centimeters, away from the lateral longitudinal face, the support rail cleaner and the support rail can also further be displaced relative to each other along the longitudinal axis without becoming blocked in the case of very heavy occurrences of contamination. As described herein, there is produced a support rail cleaner which is distinguished by improved handling.

The relative movement of the cleaning member carrier and the support rail in the transverse direction of the lateral longitudinal face provides that the cleaning members on the cleaning member carrier act on the deposits, for example, in a grinding or pulverizing manner. The transverse cleaning movement consequently supplements the parallel cleaning movement that can be produced by means of the parallel drive.

Not only can the parallel drive and/or the transverse drive move the cleaning member carrier or the cleaning member and the support rail relative to each other with the movement component mentioned, but can also generate a relative movement in other directions of movement.

If the cleaning member carrier is constructed in a roller-like manner, and the parallel drive can be, for example, constructed in the form of a rotary drive, then the roller-like cleaning member carrier can be rotated about an axis of rotation which extends, for example, parallel with the longitudinal axis of the support rail.

The cleaning member carrier and the support rail can be moved relative to each other by means of the parallel drive, and the drive can move either the carriers or the support rail, or both. In particular, it is possible to produce a periodic lifting movement of the cleaning member carrier and the support rail relative to each other by means of the parallel drive. The parallel lifting movement produced in this manner between the cleaning member carrier and the support rail provides a particularly good cleaning action. The deposits can be scraped, e.g., abraded, from the support rail by means of the cleaning members on the cleaning member carrier in an upward or downward direction owing to the lifting movement directed transversely relative to the longitudinal axis of the support rail.

There is produced a particularly effective cleaning action of the support rail by the cleaning member carrier and the support rail being moved relative to each other in such a manner that the movement portions that are associated with the parallel drive and the movement portions that are associated with the transverse drive can be superimposed with each other. In particular, the deposits are thereby removed from the support rail in a grinding and abrasive manner.

The movement components by the drives can be superimposed in such a manner that the cleaning member carrier and the support rail can be moved relative to each other along a closed (pre-determined) movement path. In that manner, it is possible for the cleaning member carrier and the support rail to be moved relative to each other repeatedly and continuously in a travelling direction on the closed movement path. A reversal of movement connected with braking and acceleration operations can consequently be prevented. Quiet and uniform operation of the support rail cleaner is thereby produced.

A particularly compact and cost-effective embodiment of the invention is produced if the parallel drive and the transverse drive have a common drive motor, that is to say, both the parallel movement and the transverse movement are produced by means of a single drive motor by the drive train having a corresponding gear mechanism. In that case, the transverse drive and the parallel drive may be structurally formed by the same drive unit.

In a cost-effective and robust construction of the invention, the gear mechanism has a control disc. The control disc can be in the form of a cam, that is to say, the gear mechanism can be in the form of an eccentric gear mechanism.

In certain embodiments of the invention, the drives move the cleaning member carriers relative to the support rail. Given the generally smaller mass of the cleaning member carrier in comparison to the mass of the support rail, a higher dynamic is produced with the same drive power of the drive motor(s). In other embodiments, the drives move the support rail(s) or both the cleaning member carriers and the support rails.

In the case of a particular embodiment of the invention, the support rail cleaner can be used flexibly on support rails with different thicknesses or with deposits that have structures of different widths. The support rail cleaner can also react flexibly and automatically to variations of the support rail thickness along the longitudinal axis of the support rail, which variations can be produced in particular by obstructions such as, for example, deposits which cannot be loosened.

For that purpose, there is provided a force-controlled travel limit device, by means of which the cleaning member carrier cannot be moved further towards the lateral longitudinal face when a maximum action force is exceeded transversely relative to the lateral longitudinal face of the cleaning member carriers. When the maximum force is exceeded, that is to say, in the event of an overload, the transverse drive advantageously does not completely stop its periodic movement, but instead the cleaning member carrier and the support rail are still moved away from each other again. To that end, the drive can be provided, for example, with a friction coupling. However, the travel limit device preferably has a resilient element that can be deformed in the event of overloading.

Because the cleaning member carriers and the support rail are periodically moved away from each other in the event of overloading in the relative position thereof with maximum spacing, many obstructions on the support rail can be bypassed without the cleaning member carriers becoming blocked.

In some embodiments, a cleaning member carrier can be constructed in such a manner, for example, in a fork-like manner, that it can be associated with both lateral longitudinal faces at the same time. However, in other embodiments, the support rail cleaner has two cleaning member carriers, between which the support rail can be arranged in order to remove the deposits. In that manner, both lateral longitudinal faces of the support rail can be cleaned particularly effectively in one operation.

One construction type of the invention is distinguished by quiet and uniform operation, wherein the two cleaning member carriers can be moved towards and away from each other synchronously so that the cleaning member carriers can be moved synchronously towards and away from the lateral longitudinal face of the support rail associated therewith. The transverse forces produced by the action on the lateral longitudinal faces or the deposits on the lateral longitudinal faces are substantially offset by the synchronous action on the cleaning member carriers so that the transverse forces do not act, or act only to a small extent, for example, on advance means of the support rail cleaner.

A particularly compact construction of the invention is provided when the two cleaning member carriers are moved relative to the support rail by means of a common transverse drive and/or a common parallel drive.

In some embodiments a cleaning tooth is provided as the cleaning member. There are generally provided on each cleaning member carrier a plurality of cleaning members, which can be in the form of cleaning teeth. To that end, the cleaning member carrier can be provided, for example, with a tooth arrangement, at the side thereof directed towards the support rail.

The cutting edges of one or more cleaning teeth are curved in some embodiments. A curved construction of the cutting edges reduces the risk of the advance movement becoming blocked if the cleaning members strike an obstruction in the advance direction.

An alternative embodiment includes coarse cleaning members, for example, cleaning teeth, and fine cleaning members, for example, bristles, on the same cleaning member carrier, and provides a particularly good cleaning action and a compact construction at the same time.

In another embodiment, the fine cleaning members are arranged at least in portions along the longitudinal axis of the support rail between coarse cleaning members. The support rail cleaner and the support rails can be displaced relative to each other in both directions along the longitudinal axis of the support rail with the same cleaning action.

A support rail cleaner that can be adapted flexibly to the cleaning task in each case is produced in that there is provided on at least one cleaning member carrier a replaceable cleaning member insert. With regard to premature wear of cleaning members, it is further advantageous to have a replaceable cleaning member insert, for example, a replaceable brush insert.

In some embodiments, the one or more cleaning member carriers are, or the support rail is, connected to a common drive motor of the parallel drive and the transverse drive for movement by means of a control disc, e.g., a cam. In some embodiments, the cleaner includes two cleaning member carriers, between which the support rail to be cleaned can be arranged. In certain embodiments, the cleaning member carriers are configured to move towards and away from each other synchronously so that the cleaning member carriers can be moved synchronously towards and away from the lateral longitudinal face of the support rail.

In another aspect, the invention features methods of cleaning a mechanical support rail of a workpiece support in a machine tool. The methods include obtaining a mechanical support rail cleaner that comprises one or more cleaning members, wherein each cleaning member comprises at least one cleaning member; moving the one or more cleaning member carriers and the support rail relative to each other and in parallel with a lateral longitudinal face of the support rail and transversely relative to a longitudinal axis of the support; and periodically moving the one or more cleaning member carriers and the support rail towards and away from each other transversely relative to the lateral longitudinal face of the support rail; thereby removing deposits from the support rail by means of the cleaning members.

In these methods the one or more cleaning member carriers and the support rail can be moved relative to each other by means of a parallel drive with a periodic lifting movement, or they can be moved relative to each other by means of a parallel drive and a transverse drive such that the relative movements produced by the drives can be superimposed with each other. Others aspects and features noted herein can also be applied in the new methods.

The details of one or more embodiments of the inventions are set forth in the accompanying drawings and the description below. Other features, objects, and advantages of the invention will be apparent from the description and drawings, and from the claims.

DETAILED DESCRIPTION

Figure 1:
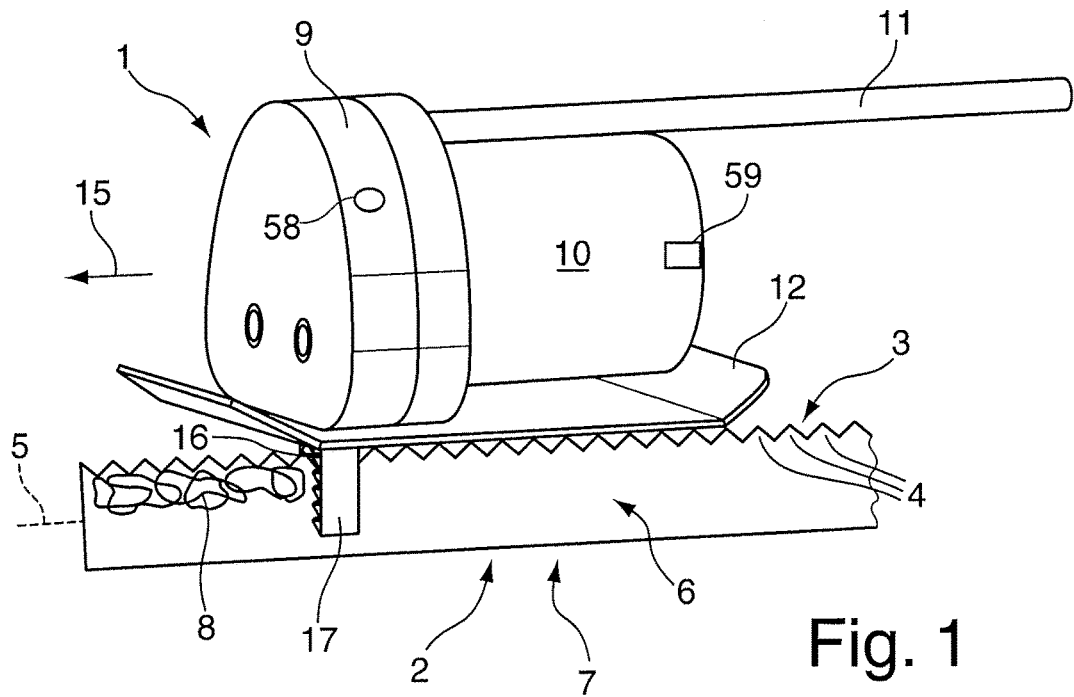
FIG. 1 is a perspective illustration of a mechanical support rail cleaner and a support rail to be cleaned.

FIG. 1 shows a mechanical support rail cleaner 1 that is arranged on a support rail 2 that is intended to be cleaned. The support rail 2 is a conventional support rail of workpiece supports, e.g., in laser cutting machines. The support rail 2 is provided at the upper side 3 thereof with serrations 4, on the tips of which the workpieces are positioned in a point-like manner. Support rails 2 can be produced from steel, e.g., mild steel, or other metals.

Only a single support rail 2 is shown in FIG. 1 for reasons of clarity. There are typically provided, transversely relative to the longitudinal axis 5 of the support rail 2, other support rails 2 (not illustrated), which are spaced apart in a parallel manner and which together define a planar support face for a workpiece. The support rail cleaner 1 is advantageously constructed in such a manner that the support rail 2 does not have to be disassembled for cleaning. However, the support rail cleaner 1 can be in the form of a stationary cleaning device, to which disassembled support rails 2 are supplied for cleaning.

Deposits 8 such as molten metal or slag adhere in the upper region of the lateral longitudinal faces 6 and 7 of the support rail 2, and as shown, the deposits 8 have already been removed by means of the support rail cleaner 1 in the longitudinal portion of the support rail 2 on the right in FIG. 1.

According to FIG. 1, the support rail cleaner 1 comprises a housing 9, a drive motor 10, a handle 11, and a plate-like guiding support 12. By means of the guiding support 12, the support rail cleaner 1 can be positioned in a defined position against the support rail 2 transversely relative to the longitudinal axis 5 of the support rail 2 or can be positioned on the support rail 2. The width of the guiding support 12 is sufficient for the support to be able to lie simultaneously on a plurality of support rails 2 in a stable manner.

The handle 11 can be provided with a handhold, which is not shown, and serves to move the support rail cleaner 1 along the support rail 2 manually in an advance direction 15. Alternatively or in addition to the handle 11, it is also possible to provide a motorized advance drive for the support rail cleaner 1.

The support rail cleaner 1 further has two cleaning member carriers 16 and 17 that protrude downwards through the guiding support 12. It can be seen from the front view shown in FIG. 2 that the cleaning member carriers 16 and 17 have a plurality of cleaning members, e.g., in the form of cutting teeth 20 at the sides 18 and 19 thereof facing each other. The support rail 2 is arranged between the cleaning member carriers 16, 17. Therefore, each of the cleaning member carriers 16, 17 are associated with an opposite lateral longitudinal face 6, 7 of the support rail 2.

The cleaning member carriers 16, 17 can be moved relative to the support rail 2 by means of a drive 21, which is arranged in the housing 9 of the support rail cleaner 1. According to FIG. 2, the cleaning member carriers 16, 17 are illustrated (solid lines) in the position thereof near the support rail. In that position, the spacing between the cleaning member carriers 16, 17 and also the cleaning teeth 20 is smallest. In particular, the cleaning teeth 20 touch the lateral longitudinal faces 6, 7 of the support rail 2 associated therewith.

Figure 2:
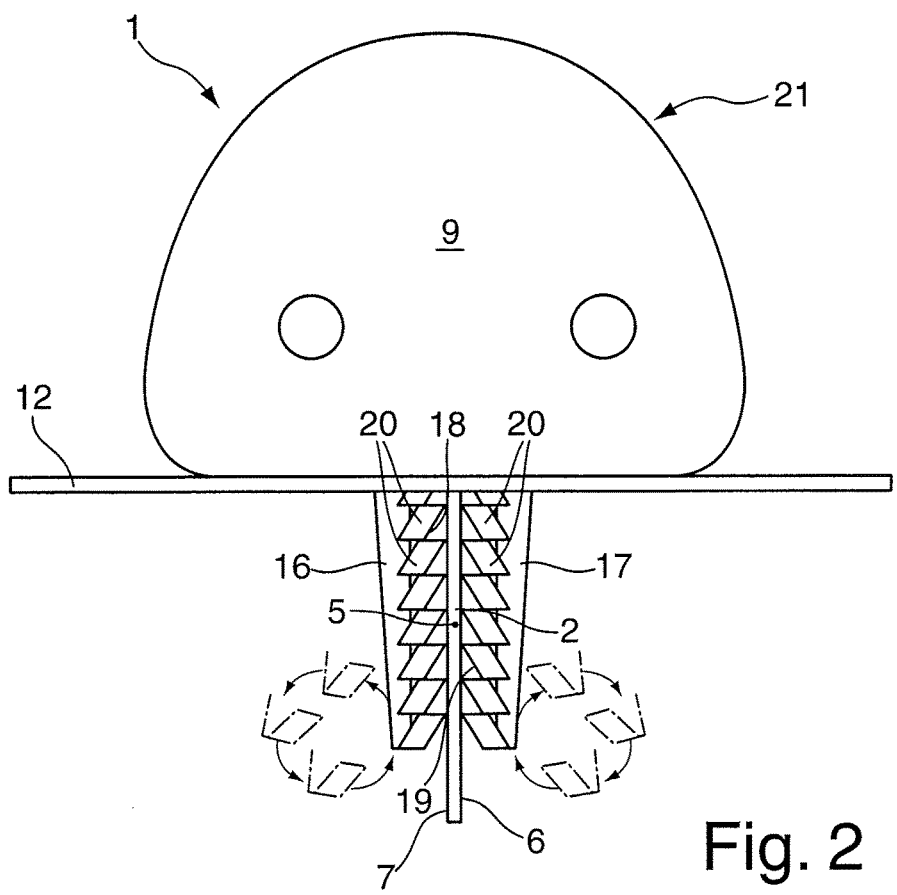
FIG. 2 is a front view of the mechanical support rail cleaner and the support rail from FIG. 1.

Furthermore, three other positions of the cleaning member carriers 16, 17 relative to the support rail 2 are indicated in FIG. 2, into which positions they can be moved by means of the drive 21. The arrows between the different positions indicate the direction of movement of the cleaning member carriers 16, 17. Accordingly, the cleaning member carriers 16, 17 are moved as mirror images and with opposing rotational directions along closed movement paths that are otherwise identical. The movement paths extend in a plane that extends perpendicularly relative to the longitudinal axis 5 of the support rail 2 (perpendicularly relative to the plane of the drawing in FIG. 2).

The relative movements of the cleaning member carriers 16, 17 and the cleaning teeth 20 arranged thereon with respect to the support rail 2 have a movement component that extends in parallel with the lateral longitudinal face 6, 7, which is associated with the cleaning member carrier 16, 17, and transversely relative to the longitudinal axis 5 of the support rail 2. In this regard, the drive 21 of the support rail cleaner 1 acts as a parallel drive.

The relative drive movements of the cleaning member carriers 16, 17 and the support rail 2 further comprise a direction of movement (e.g., a movement component) that is superimposed with the parallel movement component and that extends transversely relative to the associated lateral longitudinal faces 6, 7 of the support rail 2. Consequently, the drive 21 also acts as a transverse drive, by means of which the cleaning member carriers 16, 17 and the support rail 2 can be moved towards and away from each other transversely relative to the associated lateral longitudinal faces 6, 7 of the support rail 2.

In particular, the cleaning member carriers 16, 17 can be moved relative to the support rail 2 continuously and repeatedly along the closed movement paths illustrated so that there are produced periodic relative movements of the cleaning member carriers 16, 17 and the support rail 2. These relative movements enable the cleaning member carriers 16, 17 to move synchronously towards and away from each other, whereby the cleaning member carriers 16, 17 are simultaneously moved synchronously towards and away from the lateral longitudinal faces 6, 7 of the support rail 2 associated therewith.

The cleaning teeth 20 are moved together, first towards the associated lateral longitudinal faces 6, 7 and, at the same time, moved upwards in parallel with the lateral longitudinal faces 6, 7, as shown in FIG. 2. Given this approach movement, the deposits 8 (not shown in FIG. 2) on the support rail 2 are acted on in a grinding manner by the cleaning teeth 20 and the deposits 8 are simultaneously scraped off the support rail 2 by the upwardly directed movement component.

The cleaning teeth 20 on both sides of rail 2 are further moved away from the associated lateral longitudinal faces 6, 7, the teeth first being moved further upwards. Deposits 8 already loosened can now fall down and consequently do not impair the subsequent cleaning operation. Finally, the cleaning teeth 20, which are spaced apart from the support rail 2, are again guided downwards and towards each other. That movement sequence may be repeated continuously at high frequency.

Figure 3:
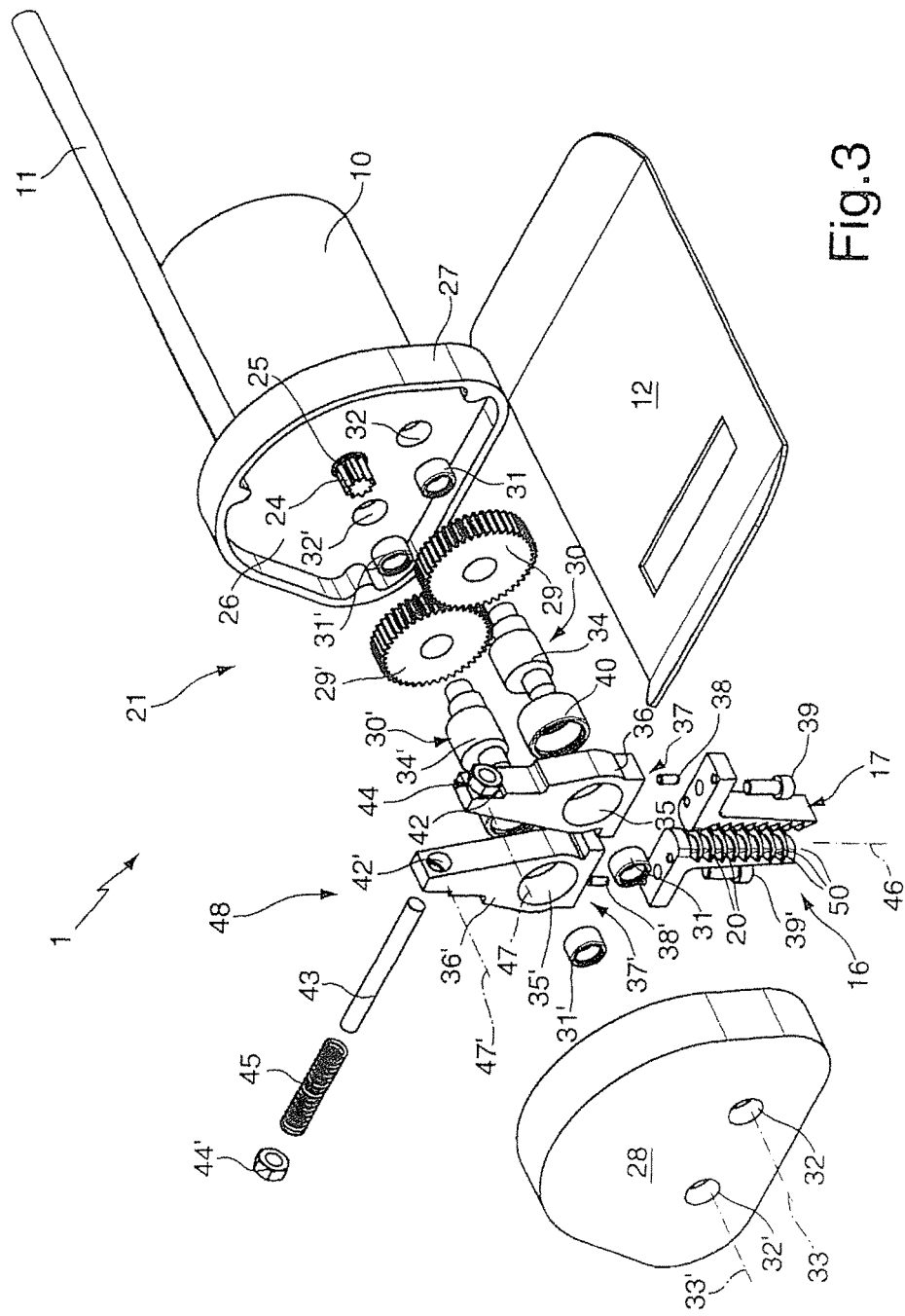
FIG. 3 is an exploded illustration of the support rail cleaner of FIG. 1.
Figure 4:
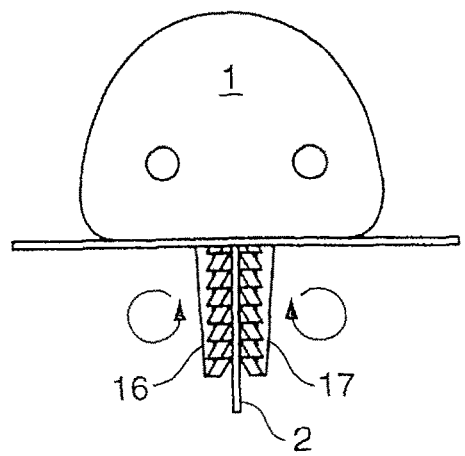
FIGS. 4 to 10 are front views of other variants of a support rail cleaner.
Figure 5:
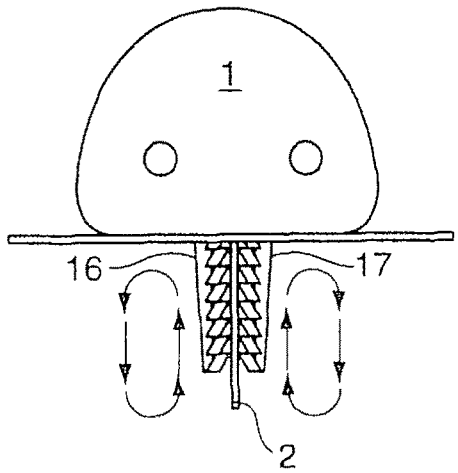
Figure 6:
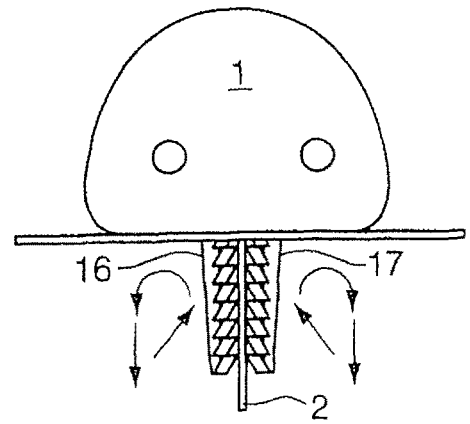
Figure 7:
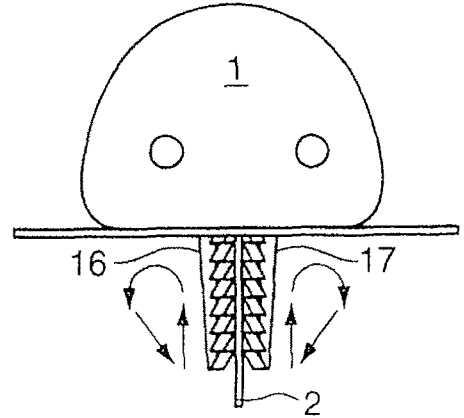
Figure 8:
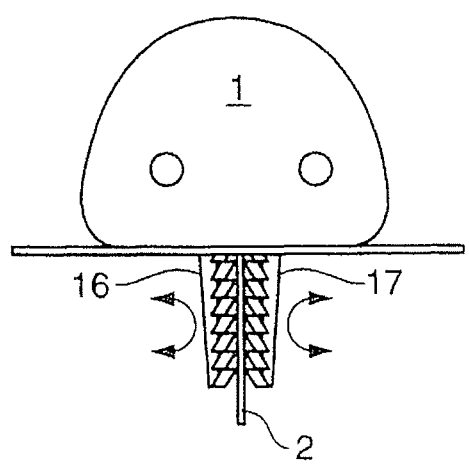

FIG. 3 is an exploded illustration of the support rail cleaner 1, and shows details of the drive 21. The drive 21 acts for both cleaning member carriers 16, 17, both as a transverse drive and as a parallel drive. The drive 21 includes, as the only drive motor, drive motor 10, e.g., in the form of an electric motor, to produce the above-described movement sequences.

An externally toothed end 24 of the motor shaft of the drive motor 10 projects through a hole 25 in a lateral wall 26 of the housing 9, which comprises two housing halves 27, 28. The external teeth of the motor shaft end 24 engage in the teeth of a gear wheel 29, which is arranged securely on a drive shaft 30. The drive shaft 30 is supported at both ends by means of bearing sleeves 31 in bearing holes 32 on the housing 9 for rotation about an axis of rotation 33, 33'.

A control disc, e.g., in the form of a cam 34, is provided on the drive shaft 30. The cam 34 is supported for rotation in a cylindrical hole 35 of a bearing plate 36 in a positive-locking manner by means of a cylindrical bearing sleeve 40. The cleaning member carrier 17 is secured to the lower side 37 of the bearing plate 36 by means of a pin 38 and a securing screw 39.

The gear train for the second cleaning member carrier 16 is constructed as a mirror image, the gear wheel 29' not being directly in engagement with the motor shaft of the electric motor. Instead, it is driven via the gear wheel 29 of the first gear train, whereby there is produced a desired reversal in the direction of rotation.

At the sides directed away from the cleaning member carriers 16, 17, bearing plates 36, 36' are each provided with a bearing hole 42, 42'. A guiding rod 43 is arranged for displacement in the bearing holes 42, 42'. At the ends thereof, there are screwed stop nuts 44, 44', which prevent the guiding rod 43 from slipping out of the bearing holes 42, 42' in the bearing plates 36, 36'. A resilient element, e.g., in the form of a rod spring 45, which is arranged between the two bearing plates 36, 36' and by means of which the bearing plates 36, 36' are mutually supported, is fitted to the guiding rod 43.

The operation of the drive 21 is explained in detail below. The gear wheel 29 is driven by means of the electric motor 10 at a generally constant speed, whereby the drive shaft 30 rotates about the axis of rotation 33. At the same time, gear wheel 29' and the drive shaft 30' of the second gear train rotate in the opposite direction about the axis of rotation 33'. Given the rotational movements of the drive shafts 30, 30', the cams 34, 34' rotate in the cylindrical holes 35, 35' of the bearing plates 36, 36'. The eccentricity of the cams 34, 34' brings about a displacement of the cylindrical holes 35, 35' along a circular path. The phases of the two cams 34, 34' are adjusted relative to each other in such a manner that the cylindrical holes 35, 35' move synchronously towards and away from each other. The cylindrical holes 35, 35' further move synchronously up and down.

Given the circular displacement of the cylindrical holes 35, 35', the bearing plates 36, 36' are raised and lowered periodically along a parallel lifting axis 46. The parallel lifting axis 46 extends, if the support rail cleaner 1 is positioned in a defined manner on a support rail 2 by means of the guiding support 12, in parallel with the lateral longitudinal faces 6, 7 of the support rail 2 and transversely relative to the longitudinal axis 5 of the support rail 2.

The periodic lifting movements of the bearing plates 36, 36' along the parallel lifting axis 46 bring about corresponding periodic lifting movements of the cleaning member carriers 16, 17 relative to the support rail 2. The parallel drive of the support rail cleaner 1 formed by the drive 21 is accordingly in the form of a periodic lifting drive.

The parallel lifting movements are further superimposed by periodic pivot movements of the cleaning member carriers 16, 17. The pivot movements of the cleaning member carriers 16, 17 are produced by the rod spring 45, which is arranged between the bearing plates 36, 36'.

During normal operation, the rod spring 45 prevents the bearing plates 36, 36' from being able to move towards each other in the region of the bearing holes 42, 42'. Given the spatial fixing in the region of the bearing holes 42, 42', the bearing plates 36, 36' carry out pivot movements due to the displacement of the cylindrical holes 35, 35' transversely relative to the parallel lifting axis 46. The pivot axes 47, 47' of the pivot movements extend in parallel with the axes of rotation 33, 33' and intersect with the bearing plates 36, 36' in the region of the bearing holes 42, 42'. Pivot movements of the cleaning member carriers 16, 17 are necessarily associated with the pivot movements of the bearing plates 36, 36'. The transverse drive formed by the drive 21 is accordingly in the form of a periodic pivot drive.

The resultant movements of the cleaning member carriers 16, 17 consequently result from a superimposition of parallel lifting movements along the parallel lifting axis 46 and pivot movements about the pivot axes 47, 47'.

Given the mutual support of the bearing plates 36, 36' by means of the rod spring 45, the support rail cleaner 1 thus has a force-controlled travel limit device 48. The force that is applied by the cleaning teeth 20 to the support rail 2 and/or the deposits 8, and which is directed transversely relative to the lateral longitudinal faces 6, 7 of the support rail 2, abuts the rod spring 45. If that force exceeds the resilient force of the rod spring 45, in particular if the cleaning teeth 20 prematurely strike the support rail 2 or an obstruction during their movement towards each other, the rod spring 45 is compressed. The compression of the rod spring 45 can produce a balancing movement of the bearing plates 36, 36', during which the bearing holes 32, 32' move closer together but, at the same time, the cleaning member carriers 16, 17 and cleaning teeth 20 arranged thereon are not further moved towards each other. The support rail cleaner 1 can thereby be used flexibly on support rails 2 having different thicknesses.

During normal operation, if the cleaning member carriers 16, 17 take up their end positions near the support rails transversely relative to the lateral longitudinal faces 6, 7, the cleaning member carriers 16, 17 or the cleaning teeth 20 arranged thereon have the smallest spacing relative to each other. That smallest spacing is advantageously adjustable in that it is possible to rotate at least one of the stop nuts 44, 44' into different positions along the rod 43. Given the adjustment of the stop nuts 44, 44' along the rod 43, the (normal) spacing of the bearing holes 42, 42' is variable and again determines the smallest spacing between the cleaning member carriers 16, 17. The greater the (normal) spacing of the bearing holes 42, 42', the smaller is the smallest (closest) spacing of the cleaning member carriers 16, 17 relative to each other.

At the same time as the adjustment of the smallest spacing, also the spacing of the cleaning member carriers 16, 17 relative to each other is adjustable that is produced when the cleaning member carriers 16, 17 are arranged in the end positions thereof remote from the support rail (greatest spacing). The greater the (normal) spacing of the bearing holes 42, 42', the smaller is the greatest spacing of the cleaning member carriers 16, 17 relative to each other.

The support rail cleaner 1 can preferably have on its housing 9 an operating element 58 for adjusting at least one stop nut 44, 44' so that at least one fine adjustment of the smallest and also the greatest spacing of the cleaning member carriers 16, 17 can be carried out relative to each other without opening the housing 9.

If the cleaning teeth 20 of one of the cleaning member carriers 16, 17 should strike an obstruction at a time before the cleaning teeth 20 of the other cleaning member carrier 16, 17, the bearing plates 36, 36' pivot together with a synchronous balancing pivot movement about the axes of rotation 33, 33'.

Since the cleaning member carriers 16, 17 are repeatedly moved at least briefly into the end positions remote from the support rail, the support rail cleaner 1 can further overcome many obstructions on the support rail 2 without the advance movement constantly becoming blocked.

Occurrences of the advance movement of the support rail cleaner 1 becoming blocked due to abrupt abutment against obstructions is further reduced in the support rail cleaner 1 in that the cutting edges 50 of the cleaning teeth 20 can be constructed so as to be curved or angled. If the curved cutting edges 50 strike an obstruction in the advance direction 15, the cleaning member carriers 16, 17 can be pressed apart from each other by means of the advance force and with the rod spring 45 becoming deformed.

The drive 21 of the support rail cleaner 1 further has control means 59 by means of which a stop position of the drive 21 can be defined. There is particularly defined as the stop position the position of the drive 21 in which the cleaning member carriers 16, 17 take up their end positions remote from the support rail transversely relative to the lateral longitudinal faces 6, 7. When the drive 21 is switched off, the drive shafts 30, 30' are first automatically rotated into the rotational positions corresponding to the defined stop position and only subsequently is the drive 21 switched off completely. In the stop position, the spacing between the cleaning member carriers 16, 17 is greatest. If the drive 21 takes up the stop position, therefore, the support rail cleaner 1 can be positioned readily along a support rail 2 or be transferred to a different support rail 2.

FIGS. 4 to 8 show alternative embodiments of support rail cleaners 1 that differ from the above-described support rail cleaner 1 in their particular movement paths, on which the cleaning member carriers 16, 17 can be moved in a controlled manner relative to the support rail 2. The drive mechanisms of the alternative embodiments shown in these figures have corresponding drive means, and can be designed according to the figures by those of skill in the art. Whereas the cleaning member carriers 16, 17 are moved in rotation around closed movement paths in the variants according to FIGS. 4 to 7, FIG. 8 shows a variant with oscillating relative movement. The embodiments of the various cleaning members shown in FIGS. 1 to 8 are examples of many different possible variations. Alternatively or in addition, bristles, friction faces, etc., can also be used as the cleaning members.

Figures 9, 10:
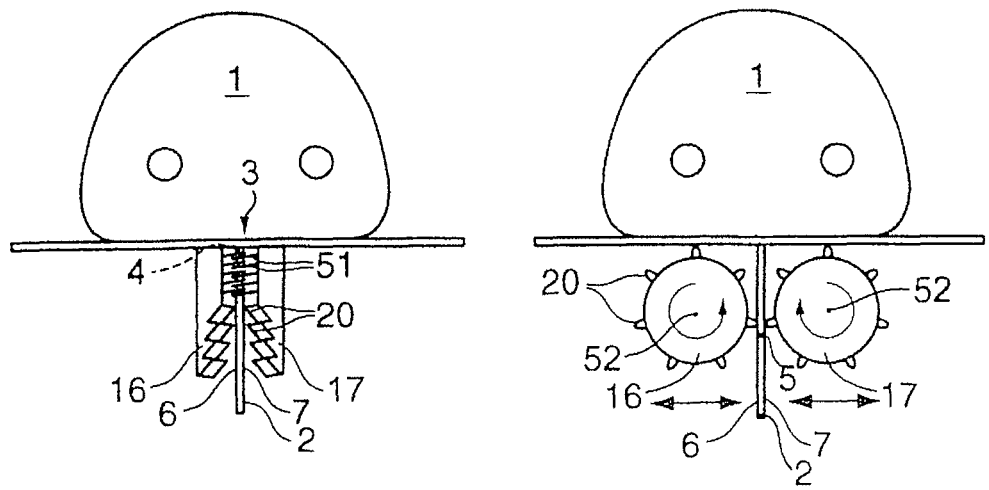

By way of example, FIG. 9 shows a variant of a support rail cleaner 1 that has coarse cleaning members in the form of cleaning teeth 20 and fine cleaning members in the form of bristles 51. According to FIG. 9, the cleaning member carriers 16, 17 are arranged in their end positions near the support rail transversely relative to the lateral longitudinal faces 6, 7. The cleaning teeth 20 are arranged on the cleaning teeth carriers 16, 17 in such a manner that the spacing between opposing cleaning teeth 20 decreases in the shown position in the direction towards the upper side 3 of the support rail 2. The wedge-like arrangement of the cleaning teeth 20 produced in this manner takes into account the requirement that the support rail 2 has to be cleaned particularly well especially in the region of the upper side 3 thereof.

The cleaning member carriers 16, 17 further have cleaning members in the form of bristles 51 that can be guided by the transverse movement of the cleaning member carriers 16, 17 transversely relative to the lateral longitudinal faces 6, 7 beyond the upper side 3 of the support rail 2, and in particular between the support serrations 4, to remove deposits 8 from the support rail 2.

Figure 11:
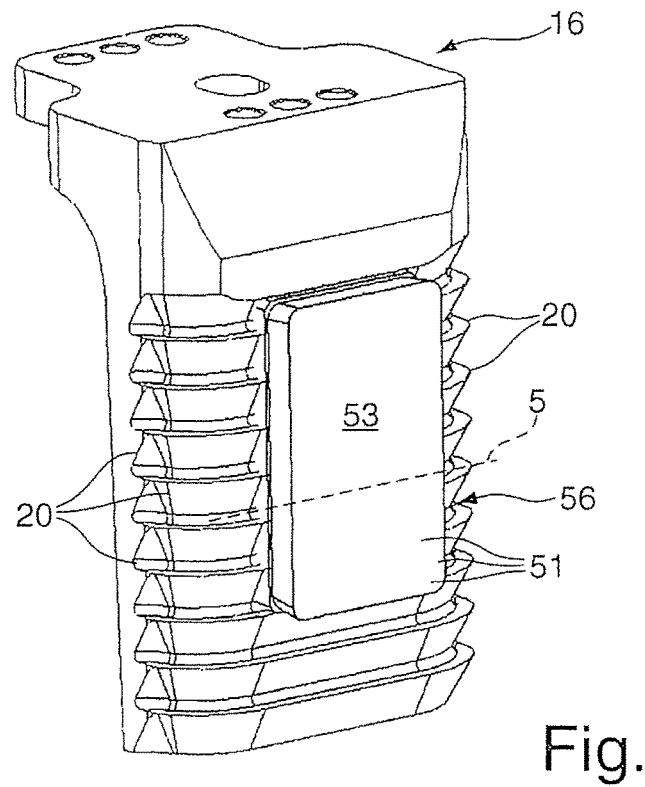
FIGS. 11 and 12 are perspective and cross-sectional illustrations, respectively, of an alternative embodiment of a cleaning member carrier.

FIG. 11 shows another variant of a cleaning member carrier 16 that can be used in the support rail cleaner 1 together with a second cleaning member carrier of the same construction.

The cleaning member carrier 16 also has coarse cleaning members in the form of cleaning teeth 20 and fine cleaning members in the form of bristles 51 (not illustrated in detail). The bristles 51 form a field 53 of bristles (shown as a block of bristles in FIG. 11). Overall the cleaning member carrier 16 shown in FIG. 11 is constructed to be wider than, for example, the cleaning member carrier 16 shown in FIG. 3.

FIG. 11 indicates the extent of the longitudinal axis 5 of the support rail 2 when the support rail 2 is cleaned with a support rail cleaner 1 provided with at least one cleaning member carrier 16 as shown in FIG. 11. The cleaning member carrier 16 is distinguished by a specific cleaning action because, in particular in the portion of the cleaning member carrier 16 which is associated with the upper portion of the support rail 2, the bristles 51 (fine cleaning members) follow the cleaning teeth 20 (coarse cleaning members) in at least one direction along the longitudinal axis 5 so that it is possible to have first coarse cleaning and subsequently fine cleaning of the support rail 2 by means of the cleaning members on the same cleaning member carrier 16.

The cleaning member carrier 16 is further constructed in such a manner that the support rail cleaner 1 and the support rail 2 can be moved relative to each other in both directions along the longitudinal axis 5 during cleaning, but with the cleaning action in both directions being equally good. This is brought about in that the bristles 51—at least in the upper portion of the cleaning member carrier 16—are arranged between the cleaning teeth 20 along the longitudinal axis 5 indicated in FIG. 11. The cleaning member carrier is provided with a row of cleaning teeth at each of the lateral edges. The bristle field 53 is arranged between the rows of cleaning teeth. A row of cleaning teeth is provided under the bristle field 53. In particular, the cleaning members are arranged symmetrically on the cleaning member carrier 16.

Figure 12:
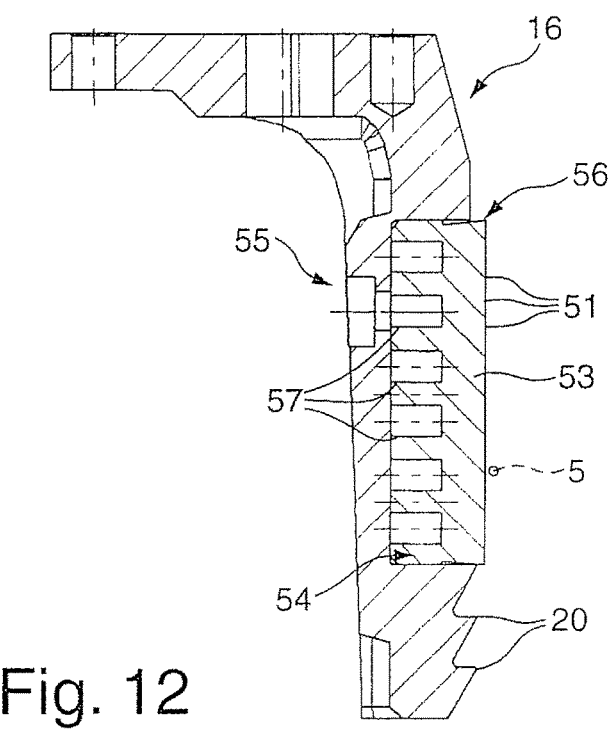

It can be seen in FIG. 12, which is a sectional illustration of the cleaning member carrier 16, that the bristle field 53 formed by the bristles 51 is secured to a plate-like bristle carrier 54, which is releasably connected to the cleaning member carrier 16 by a screw type connection 55. The securing screw is not illustrated in FIG. 12. The bristle carrier 54 and the bristle field 53 form a brush insert 56 which can readily be changed by means of the releasable connection between the cleaning member carrier 16 and the brush insert 56. This is advantageous particularly because the bristles 51 generally wear more quickly than the cleaning teeth 20 and consequently have to be replaced more frequently than the cleaning teeth 20.

The bristle carrier 54 has a plurality of threaded holes 57 for receiving a securing screw so that it can be secured to different embodiments of cleaning member carriers 16.

Finally, FIG. 10 shows a variant of a support rail cleaner 1 that has roller-like cleaning member carriers 16, 17, which can be rotated by means of a drive about axes of rotation 52, which extend in parallel with the longitudinal axis 5 of the support rail 2. The cleaning member carriers can further periodically be displaced or pivoted transversely relative to the lateral longitudinal faces 6, 7 by means of a drive, which is generally of a similar construction as the drive shown in FIG. 3.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A mechanical support rail cleaner for cleaning a support rail of a workpiece support in a machine tool, comprising
    a plate-like guiding support by means of which the support rail cleaner can be positioned against a support rail;
    one or more cleaning member carriers protruding from the plate-like guiding support and each comprising at least one cleaning member, wherein each cleaning member carrier is associated with a lateral longitudinal face of the support rail when the plate-like guiding support lies on the support rail; and
    a drive motor acting as both a parallel drive and a transverse drive, wherein the drive motor is connected to the one or more cleaning member carriers by a gear mechanism;
    wherein the drive motor acting as the parallel drive moves the one or more cleaning member carriers in a parallel movement along the associated lateral longitudinal face of the support rail and perpendicularly up and down relative to a longitudinal axis of the support rail to remove deposits from the support rail by means of the at least one cleaning member; and
    wherein the drive motor acting as the transverse drive periodically moves the one or more cleaning member carriers towards and away from the associated lateral longitudinal face of the support rail in a direction that extends transversely relative to the associated lateral longitudinal face of the support rail to remove deposits from the support rail by means of the at least one cleaning member.

2. The mechanical support rail cleaner of claim 1, wherein the drive motor acting as the parallel drive moves the one or more cleaning member carriers with a periodic lifting movement in parallel with the associated lateral longitudinal face of the support rail and perpendicularly up and down relative to a longitudinal axis of the support rail.

3. The mechanical support rail cleaner of claim 1, wherein the the drive motor is connected to the one or more cleaning carrier members by the gear mechanism such that the movements produced by the drive motor acting as the parallel drive and the movements produced by the drive acting as the transverse drive can be superimposed with each other.

4. The mechanical support rail cleaner of claim 1, wherein the drive motor is connected to the one or more cleaning carrier members by the gear mechanism such that the drive motor moves the one or more cleaning member carriers periodically in a controlled manner along a movement path relative to the support rail.

5. The mechanical support rail cleaner of claim 1, wherein the gear mechanism comprises a control disc.

6. The mechanical support rail cleaner of claim 5, wherein the control disc is a cam.

7. The mechanical support rail cleaner of claim 1, further comprising a force-controlled travel limit device for the movement of the one or more cleaning member carriers towards the support rail transversely relative to the associated lateral longitudinal face of the support rail.

8. The mechanical support rail cleaner of claim 1, wherein the mechanical support rail cleaner comprises two cleaning member carriers each comprising at least one cleaning member, between which cleaning member carriers the support rail to be cleaned can be arranged such that each cleaning member carrier is associated with one of two lateral longitudinal faces of the support rail.

9. The mechanical support rail cleaner of claim 8, wherein the two cleaning member carriers are configured to move towards and away from each other synchronously so that the two cleaning member carriers can be moved synchronously towards and away from the respective associated lateral longitudinal faces of the support rail.

10. The mechanical support rail cleaner of claim 1, wherein the at least one cleaning member comprises a cleaning tooth.

11. The mechanical support rail cleaner of claim 10, wherein the cleaning tooth comprises a cutting edge that extends in a curved manner.

12. The mechanical support rail cleaner of claim 1, wherein the one or more cleaning member carriers each comprise at least two cleaning members, wherein a first cleaning member comprises cleaning teeth and a second cleaning member comprises cleaning bristles on the same cleaning member carrier.

13. The mechanical support rail cleaner of claim 1, wherein the one or more cleaning member carriers each comprise two cleaning members comprising cleaning teeth and one cleaning member comprising cleaning bristles, wherein the cleaning bristles are arranged along the longitudinal axis of the support rail between the two cleaning members comprising teeth.

14. The mechanical support rail cleaner of claim 1, wherein at least one cleaning member carrier comprises a replaceable cleaning member insert.

15. A method of cleaning a mechanical support rail of a workpiece support in a machine tool, the method comprising
- obtaining a mechanical support rail cleaner of claim 1 that comprises one or more cleaning member carriers, wherein each cleaning member carrier comprises at least one cleaning member;
- moving the one or more cleaning member carriers and the support rail relative to each other and in parallel with a lateral longitudinal face of the support rail and transversely relative to a longitudinal axis of the support; and
- periodically moving the one or more cleaning member carriers and the support rail towards and away from each other transversely relative to the lateral longitudinal face of the support rail;
- thereby removing deposits from the support rail by means of the cleaning members.

16. The method of claim 15, wherein the one or more cleaning member carriers and the support rail are moved relative to each other by means of a parallel drive with a periodic lifting movement.

17. The method of claim 15, wherein the one or more cleaning member carriers and the support rail are moved relative to each other by means of a parallel drive and a transverse drive such that the relative movements produced by the drives can be superimposed with each other.

\* \* \* \* \*

UNITED STATES PATENT AND TRADEMARK OFFICE
CERTIFICATE OF CORRECTION

PATENT NO. : 9,956,593 B2
APPLICATION NO. : 12/976288
DATED : May 1, 2018
INVENTOR(S) : Andreas Janutin et al.

Page 1 of 1

It is certified that error appears in the above-identified patent and that said Letters Patent is hereby corrected as shown below:

On the Title Page

Column 1 ((75) Inventors), Line 3, delete "Igls" and insert -- Igis --

In the Claims

<u>Column 12</u>
Line 12, in Claim 3, delete "the the" and insert -- the --

Signed and Sealed this
Twenty-third Day of October, 2018

Andrei Iancu
*Director of the United States Patent and Trademark Office*